E. O. WALSER.
GEAR SHIFTING MECHANISM.
APPLICATION FILED FEB. 27, 1914.
1,138,914.
Patented May 11, 1915.
2 SHEETS—SHEET 1.
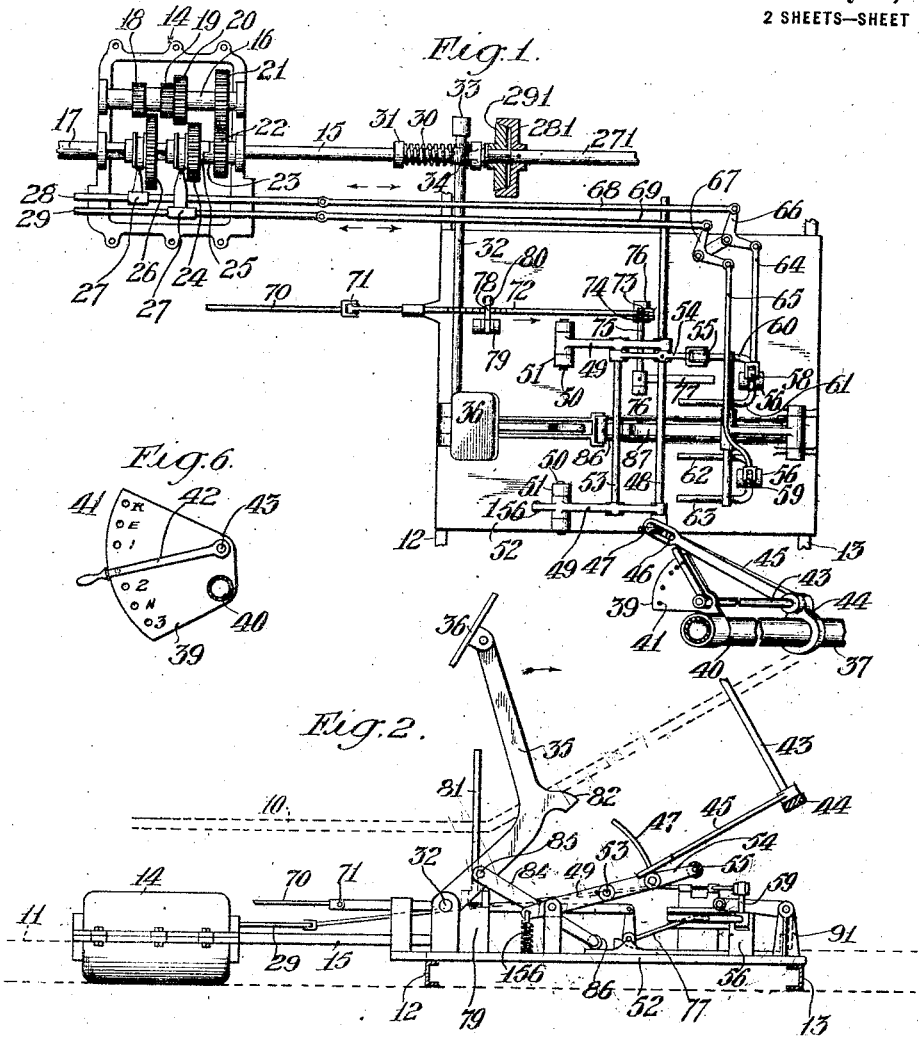
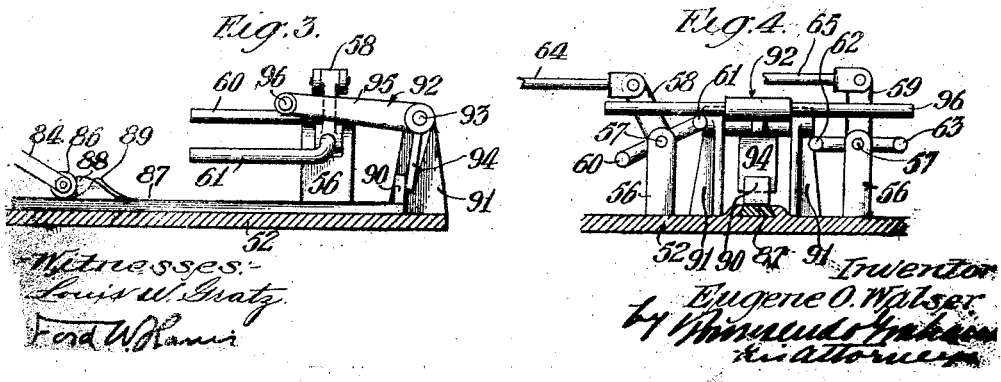
Witnesses:
Louis W. Gratz
Ford W. Harris
Inventor
Eugene O. Walser
by his Attorney

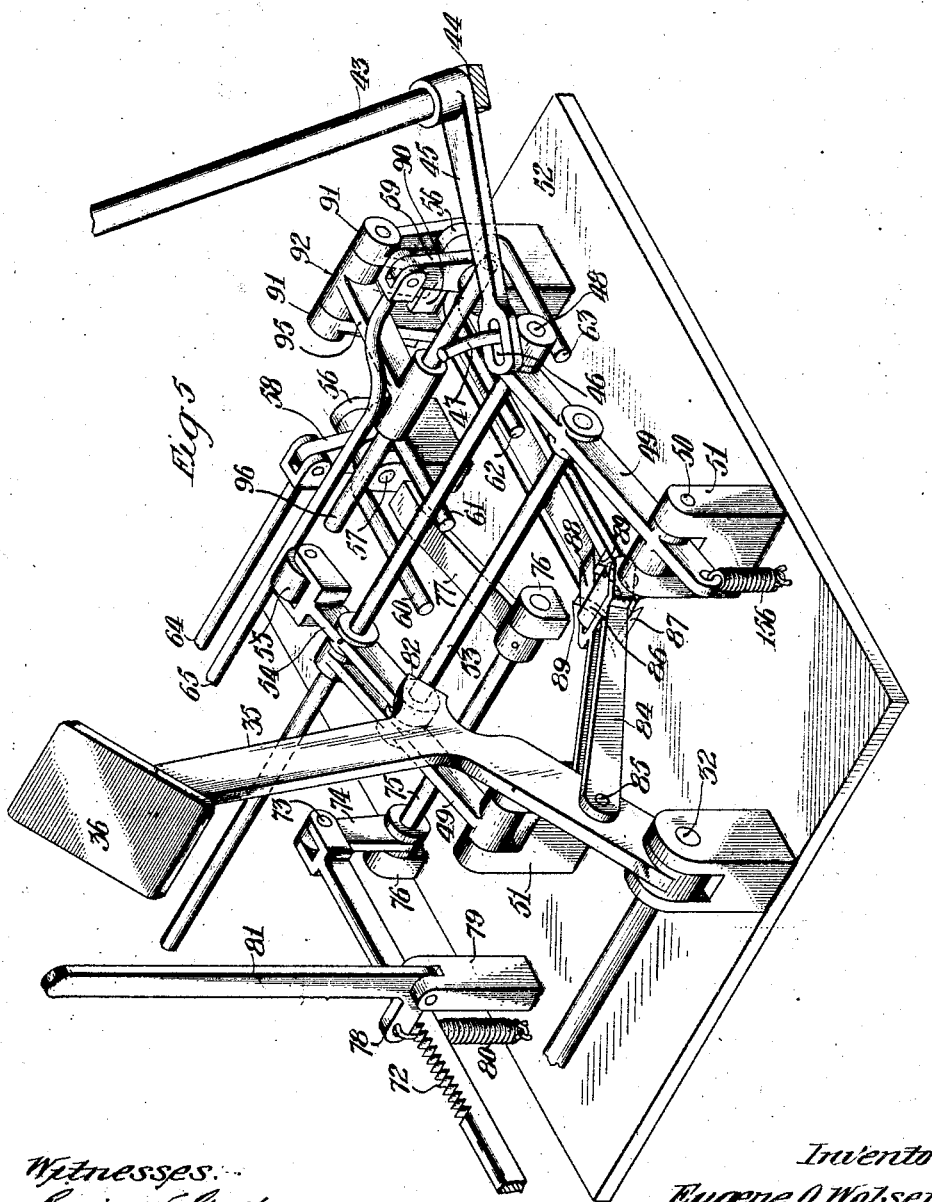

UNITED STATES PATENT OFFICE.

EUGENE O. WALSER, OF LOS ANGELES, CALIFORNIA.

GEAR-SHIFTING MECHANISM.

1,138,914. Specification of Letters Patent. Patented May 11, 1915.

Application filed February 27, 1914. Serial No. 821,569.

*To all whom it may concern:*

Be it known that I, EUGENE O. WALSER, a citizen of Switzerland, residing at Los Angeles, in the county of Los Angeles and State of California, have invented a new and useful Gear-Shifting Mechanism, of which the following is a specification.

The invention relates to systems of power transmission in which any one of several gear ratios are used between the prime mover and the load and in which it is desirable to quickly change the gears and thus change the ratio. The selective sliding gear mechanism employed in automobiles is a common form of mechanism which is in use for this purpose.

The principal object of the invention is to provide such a transmission mechanism in which the gear ratio may be selected in advance of actually being thrown in, this throwing in being accomplished by separate means and subsequently to the selection of the desired gear ratio. In the usual application of such variable gear transmission mechanism to machinery, and especially automobiles, it is common to employ a clutch between the gear box and the prime mover, the clutch being thrown out during the time the gears are being shifted.

A further purpose of my invention is to provide a mechanism which will be interlocked with the clutch and operated by the same lever which actuates the clutch. In mechanism of this character, the simultaneous engagement of two different sets of gears, each set having a different ratio, will result in the stripping of the teeth or otherwise injuring one set of these gears.

A further object of my invention is to provide means for always throwing each and every set of gears into the disengaged or neutral position preliminary to the throwing of any one set into engagement.

A further object of my invention is to provide means whereby the operator, if he desires to do so, may positively throw all the gears into the disengaged position without the subsequent engagement of any gear.

In the standard form of selective sliding gear transmission mechanism a hand lever is provided working in an H-shaped slot, and an emergency brake lever is commonly placed adjacent thereto and turning about the same center.

A further object of my invention is to provide means whereby an emergency brake lever can be dispensed with, the control of the emergency brake being accomplished by means incorporated in the gear shifting means.

Further objects and advantages will appear hereinafter.

Referring to the drawings, which are for illustrative purposes only: Figure 1 is a plan view of the mechanism embodying my invention as it would be applied to an automobile, not shown, certain of the connected parts of the automobile being shown partly in section. Fig. 2 is a side elevation of the mechanism shown in Fig. 1, parts of the automobile being indicated by dotted lines. Figs. 3 and 4 are enlarged elevations taken at right angles to each other and shown partly in section, these figures being particularly designed to illustrate the rocking levers and the coöperating parts. Fig. 5 is a perspective view of the operating mechanism illustrated in Figs. 1 and 2. Fig. 6 is a plan of selector segment.

In these drawings, 10 is the floor of an automobile, 11 being the side frames thereof. Channels 12 and 13 are connected to the frames 11 for the purpose of supporting the mechanism embodying my invention.

14 is a gear box of standard design having a transmission shaft 15, a countershaft 16 and a differential shaft 17. Mounted rigidly on the countershaft 16 are gears 18, 19, 20 and 21. Mounted rigidly on the transmission shaft 15 is a gear 22 permanently in mesh with the gear 21 and thus driving the countershaft 16 whenever the transmission shaft 15 is actuated. A jaw clutch 23 is formed on the gear 22. A sliding gear 24 has a similar clutch 25 formed thereon and slides on the shaft 17 which is square. A similar sliding gear 26 also slides on the square portion of the shaft 17. The gear 24 is of suitable diameter to mesh with the gear 20 when thrown in one direction. When the gear 24 is thrown in the other direction the clutches 23 and 25 lock together and the shaft 15 drives the shaft 17 direct. The gear 26 engages the gear 19 when thrown in one direction and engages a reversing pinion, not shown, driven from the gear 18 when thrown in the other direction. The gears 24 and 26 are shifted by means of arms 27 carried on rods 28 and 29. The rods 28 and 29 are usually actuated by means of a hand lever moving in the H-shaped slot beside the driver's seat, and an emergency brake handle is also provided adjacent thereto. When the rods 28 and 29 are in the center position, the main transmission shaft 15 is entirely disconnected from the differential shaft 17, and a movement of the rods 28 and 29 in either direction throws in one or the other of the gears which, being of different diameter, change the ratio of transmission of speed between the shafts 15 and 17. The particular gear box shown is designed for three forward speeds and one reverse. The main transmission shaft 15 is connected and disconnected from an engine shaft 271 by means of a clutch, this clutch consisting of an outer member 281 keyed to the engine shaft 271 and an inner member 291 slidably keyed to the main transmission shaft 15, the members 281 and 291 being normally held in engagement by means of a spring 30 surrounding the shaft 15 and pressing against a collar 31 secured thereon. A clutch shaft 32 is provided mounted on a bearing 33 secured on the frame of the car, and rigidly secured on said shaft is a lever 34 which extends downwardly and engages the inner member 291 in such a manner that as the clutch shaft 32 is rotated the members 281 and 291 are disengaged. The clutch shaft 32 has rigidly keyed thereon a pedal lever 35 which carries at its upper end a pedal 36.

It is common practice to provide automobiles with a steering column 37 which carries a steering wheel at its upper end, this steering wheel being omitted from the drawing for the sake of clearness. The usual forms of gasolene and spark controlling mechanism are mounted inside this steering wheel, these also being omitted for the sake of clearness.

The parts above referred to and described are standard in form, and are such as are commonly found on automobiles. It is obvious that other common forms of gearing might be used or that the gearing might be applied to other forms of machinery than the automobile illustrated.

In the form of my invention illustrated, a selector segment 39 is provided mounted on a stationary tube 40 which surrounds the steering column 37. This segment has a plurality of small holes 41 near its outer edge corresponding to the reverse, emergency brake, low, intermediate, neutral and high positions, and a selector segment index 42 is rigidly fastened to a selector segment shaft 43 which extends downwardly beside and parallel to the tube 40. The index 42 is flexible, and carries a small pin near its outer end, which is so located that it automatically springs into the holes 41 when the index is turned to the proper position. The shaft 43 is mounted at its lower end in a bearing 44 fastened to the tube 40, and a selector lever 45 is rigidly secured to the shaft 43 and is provided with a slot 46 at its outer end. A segmental rod 47 extends upwardly through and is engaged in the slot 46, the segmental rod 47 being rigidly secured to a selector rod 48. The selector rod 48 slides easily in bearings on the outer end of two selector frame levers 49. These levers are pivoted upon pins 50 carried in bearings 51 which extend upwardly from a supporting plate 52 which extends under and supports the mechanism and which is itself rigidly secured to and supported by the channels 12 and 13. The selector frame levers 49 are rigidly connected together by means of a fixed rod 53. Rigidly fastened to the selector rod 48 is a selector finger casting 54 which carries a selector roller 55 mounted on a suitable pin in its outer end and which extends outwardly and slidably engages the fixed rod 53 at its inner end. A spring 156 is provided on the selector frame lever 49 of sufficient strength to normally hold the selector frame levers 49 and their connected parts in the upper position, as shown in the drawings.

Extending upwardly from the supporting plate 52 are bearings 56 in which are mounted pins 57. Upon the pins 57 are pivoted rocking levers 58 and 59. These levers are each provided with a pair of projecting rocking lever arms 60, 61, 62 and 63, and rocking lever rods 64 and 65 are pivoted at the upper end of the levers 58 and 59. These rocking lever rods extend over and engage rocking lever rods extend over and engage bell cranks 66 and 67 pivoted upon bearings secured to the supporting plate 52. The other ends of the bell cranks 66 and 67 have pivotally secured to them gear shift rods 68 and 69, these rods extending rearwardly and being pivoted to the rods 28 and 29 previously referred to. An emergency brake rod 70 connects to the emergency brake not shown and is pivoted at 71 to an emergency brake ratchet 72 which extends forward and is pivoted at 73 to an emergency brake lever 74 which is pivoted on a shaft 75, this shaft being supported in suitable bearings 76 formed on the supporting plate 52. An emergency brake arm 77 extends forwardly between the rocking lever arms 60 and 61. An emergency brake pawl 78 is mounted in bearings 79 formed on the supporting plate 52 and is held in engagement with the emergency brake ratchet by means of a spring 80. An emergency pawl lever 81 extends upwardly through the floor 10 of the car in a location where it may be readily actuated by the foot of the operator.

The pedal lever 35 has a projection 82 formed thereon at a suitable radial distance to strike upon the fixed rod 53 when the pedal is sufficiently depressed. A reset link 84 is also pivoted at one end to the pedal lever 35, at 85, and carries a reset roller 86 at its other end. This reset roller 86 rests upon a slide 87 and presses against a projection 88 formed upon the slide. Cams 89 are provided on either side of the slide 87 and the roller 86 is made of sufficient width so that it may be disengaged from the projection 88 by means of the cams 89 as it moves in the direction of the arrow shown in Fig. 3. The slide 87 extends forwardly and is provided with a projection 90 on its forward end, this projection 90 extending upwardly between bearings 91 in which a reset lever 92 is mounted on a pin 93, the reset lever having a downwardly projecting arm 94 which is engaged by the projection 90 on the slide 87 as the slide moves forward. The reset lever 92 is also provided with a rearwardly extending arm 95 which carries a reset bar 96. The reset bar 96 extends outwardly over the rocking lever arms 60, 61, 62 and 63.

The method of operation of my invention can best be made plain by considering it as applied to an automobile and by describing the operations in the sequences in which they occur in starting and operating the automobile. The automobile would commonly be started with all the gears in the gear box 14 out of engagement and with the clutch members 281 and 291 in engagement, the pedal 36 being in its upper position as shown in Figs. 1 and 2. The engine being started, engine shaft 271 is rotated, rotating the main transmission shaft 15 through the clutch members 28 and 29. When it is desired to throw the transmission mechanism into the reverse position, the selector index 42 is moved to the hole 41 which is marked R to designate the reverse speed. This does not throw the gears, but turns the shaft 43 and the selector lever 45 in such a manner as to draw the selector rod 48 through the selector frame levers 49 into a position where the selector roller 55 is directly over the rocking lever arm 60, which corresponds to the reverse speed. In other words, the operator sets the selective mechanism in the proper position for throwing in the gear desired. The actual throwing of the gear is accomplished by means of the pedal lever 35. The proportion of the parts is such that the early part of the motion of the pedal lever simply disengages the members 281 and 291, thus releasing the clutch. As the pedal lever is further depressed in the direction of the arrow shown in Fig. 2, the reset roller 86 strikes upon the projection 88 of the slide 87 and moves it forward, causing the projection 90 to strike upon the arm 94, thus throwing the reset bar 96 downwardly and contacting with all the rocking lever arms 60, 61, 62 and 63 which project outwardly thereunder. A further movement of the pedal lever 35 results in forcing the reset bar 96 into such a position that the rocking lever arms are in the same plane, thus throwing the rods 28 and 29 to their central position, with all the gears disengaged. That is, the movement of the pedal first disconnects the clutch and then releases all the gears in the gear box 14. A further movement of the pedal lever 35 results in the reset roller 86 being lifted by the cams 89 and freed from its engagement with the projection 88 so that a further movement of the pedal lever 35 does not further actuate the slide 87. Immediately thereafter the projection 82 of the pedal lever 35 strikes against the fixed rod 53 of the selector frame, forcing this rod downwardly; the fixed rod 53, the selector frame levers 49 and the selector rod 48 all being forced downwardly by a further movement of the pedal, the selector roller 55 being directly over the rocking lever arm 62 corresponding to the first speed. A further movement of the pedal lever 35 causes the selector roller 55 to strike upon the rocking lever arm 60 and force it downwardly, thus actuating the rocking lever 58, the rod 64, the bell crank 66, and the rod 68 which is connected to the rod 28. The movement of the rod 28 is such that the gear 26 is thrown into mesh with a reverse gear, not shown, but which is in mesh with the gear 18. The pedal 36 then being released, the selector arms 49 are lifted by the spring 56, leaving the gear 26 in mesh. A further release of the pedal 36 causes an engagement of the clutch and the engine is then connected to the shaft 17 through the gear box 14 and the clutch members 281 and 291. The operator can then move the selector lever 42 to engage any of the holes 41 without disturbing the gear 26. He can also release the clutch without changing this gear provided he pushes the pedal 36 only far enough to release the clutch. When however he pushes the pedal 36 to its extreme position he first disengages the gear 26 and then throws in the gear indicated by the position of the selector arm 42. Should he desire to set his emergency brake he moves the selector arm 43 to the position E, thus throwing the roller 55 over the emergency brake arm 77. When the pedal 36 is depressed the roller 55 strikes upon this emergency brake arm 77 and pushes it down. This acts, through the shaft 75, and the lever 74 on the emergency brake ratchet 71, pulling it in the direction of the arrow in Fig. 1, and applying the emergency brake through the rod 70. When the brake is applied the spring 80 holds the pawl 78 in engagement with the ratchet 72 which may be released by striking the foot against the lever 81.

It is obvious that my invention might be applied to other arrangements of gear boxes than that illustrated and described and that any arrangement of parts providing variable ratio means might be substituted for the gearing shown. For example, the gears 25 and 26 might turn freely on the shaft 17 and be permanently in mesh and that they might be connected to the shaft 17 by suitable clutches. Or belts and pulleys or other suitable friction devices might be used to connect the counter shaft 16 and the differential shaft 17, suitable clutches being used on either shaft to provide the variable feature. All such modifications are within the spirit of my invention constituting the variable ratio means of the claims.

There is a particular utility in the combination of the emergency brake mechanism with the gear shifting mechanism proper, and the result of this combination is a new result not attained by the separate actuation of these parts, as in the standard types of construction now in use. To understand this new result, it is necessary to consider the emergencies which arise in driving an automobile and the conditions to be met in those emergencies. The emergency brake is commonly used to provide an extremely quick stop under conditions of danger. A skilful driver in handling his automobile in emergencies with my invention will throw the automobile into the high or intermediate gear upon which he habitually operates, and will then throw the selector arm to the emergency brake position. It will then be possible for him to remain in high gear as long as he likes, and it will be possible for him to release his clutch by pushing down upon the clutch pedal a sufficient amount to release the clutch, but not to operate the reset. Should a sudden emergency arise, however, he can by a single motion release his clutch and set his emergency brake. In other words, with the car running in high or intermediate gear, and with the selector arm set to the emergency brake position, the operator can in time of sudden emergency absolutely stop his car without letting go of the steering wheel with his hands and by a single motion with his foot. As these emergencies arise very suddenly the elimination of extra motions is of great importance, and I regard this feature of my invention as a very important one.

What I claim is:—

1. A variable ratio gearing comprising a driving shaft, a driven shaft, several different ratio means for connecting the shafts, suitable mechanisms for throwing each of said ratio means into operative relation, reset means for throwing all of said ratio means out of operative relation, a selector adapted to be thrown into engagement with any of said mechanisms, and operating means engaging and actuating said reset means and selector.

2. A variable ratio gearing comprising a driving shaft, a driven shaft, a clutch connecting one of the shafts to an external driving means, several different ratio means for connecting the shafts, suitable mechanisms for throwing each of said ratio means into operative relation, reset means for throwing all of said ratio means out of operative relation, a selector adapted to be thrown into engagement with any of said mechanisms, 70 and operating means connected to said clutch and actuating said reset means and selector.

3. A variable ratio gearing comprising a driving shaft, a driven shaft, a clutch connecting one of the shafts to an external driving means, several different ratio means for connecting the shafts, suitable mechanisms for throwing each of said ratio means into operative relation, reset means for throwing all of said ratio means out of operative relation, a selector adapted to be thrown into engagement with any of said mechanisms, and a lever permanently connected to said clutch and engaging and actuating said reset means and selector.

4. A variable ratio gearing comprising a driving shaft, a driven shaft, a clutch connecting one of the shafts to an external driving means, several different ratio means for connecting the shafts, suitable mechanisms for throwing each of said ratio means into operative relation, reset means for throwing all of said ratio means out of operative relation, a selector adapted to be thrown into engagement with any of said mechanisms, a lever permanently connected to said clutch, means connected to said lever for actuating said reset means, and means connected to said lever for actuating said selector.

5. A variable ratio gearing comprising a driving shaft, a driven shaft, a clutch connecting one of the shafts to an external driving means, several different ratio means for connecting the shafts, suitable mechanisms for throwing each of said ratio means into operative relation, reset means for throwing all of said ratio means out of operative relation, a selector adapted to be thrown into engagement with any of said mechanisms, a lever permanently connected to said clutch and having a projection engaging said selector, a reset link pivoted to said clutch, and a slide actuated by said reset link to actuate said reset means.

6. A variable ratio gearing comprising a plurality of driving gears, a clutch, actuating means for said clutch, mechanisms for actuating each of said driving gears, a selector for engaging each of said mechanisms, a reset means for releasing all of said driving gears, and means connected to said actuating means for said clutch for actuating said selector and reset means.

7. A variable speed gearing comprising a plurality of driving gears, a clutch, means for actuating said clutch, mechanisms for actuating each of said driving gears, a selector for engaging each of said mechanisms, a reset means for releasing all of said driving gears, and means connected to said means for actuating said clutch for actuating said selector and reset means when the clutch is released.

8. A variable speed gearing comprising a plurality of driving gears, a clutch, operating means for said clutch, mechanisms for actuating each of said driving gears, a selector for engaging each of said mechanisms, a reset means for releasing all of said driving gears, means for actuating said reset device from said operating means after the clutch is released, and means for actuating said selector to throw a particular driving gear into mesh after said reset device is actuated.

In testimony whereof, I have hereunto set my hand at Los Angeles, California, this 19th day of February, 1914.

EUGENE O. WALSER.

In presence of—
 FERD. W. HARRIS,
 FRED A. MANSFIELD